(12) United States Patent
Wu (10) Patent No.: US 11,625,841 B2
(45) Date of Patent: Apr. 11, 2023

(54) LOCALIZATION AND TRACKING METHOD AND PLATFORM, HEAD-MOUNTED DISPLAY SYSTEM, AND COMPUTER-READABLE STORAGE MEDIUM

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/869,413

(22) Filed: Jul. 20, 2022

(65) Prior Publication Data
US 2022/0358663 A1 Nov. 10, 2022

Related U.S. Application Data

(63) Continuation of application No. PCT/CN2021/114364, filed on Aug. 24, 2021.

(30) Foreign Application Priority Data

Sep. 16, 2020 (CN) .......................... 202010974857.9

(51) Int. Cl.
*G06T 7/73* (2017.01)
*G06F 3/0346* (2013.01)
(Continued)

(52) U.S. Cl.
CPC .............. *G06T 7/292* (2017.01); *A63F 13/24* (2014.09); *G06F 3/012* (2013.01); *G06F 3/0346* (2013.01);
(Continued)

(58) Field of Classification Search
CPC ........... G06T 7/246; G06T 7/292; G06T 7/30; G06T 7/33; G06T 7/70; G06T 7/73;
(Continued)

(56) References Cited

U.S. PATENT DOCUMENTS

| 2017/0357333 | A1 | 12/2017 | Balan et al. |
| 2019/0384407 | A1 | 12/2019 | Smith et al. |
| 2022/0345610 | A1* | 10/2022 | Zhang et al. ......... G06V 20/13 |

FOREIGN PATENT DOCUMENTS

| CN | 105718879 A | 6/2016 |
| CN | 107153369 A | 9/2017 |

(Continued)

OTHER PUBLICATIONS

International Search Report dated Dec. 2, 2021 in International Application No. PCT/CN2021/114364 (3 pages) with an English translation (2 pages).

*Primary Examiner* — Andrew W Johns (57) ABSTRACT

A localization and tracking method, a localization and tracking platform, a head-mounted display system, and a computer-readable storage medium are provided. One or more images of odd frames and one or more images of even frames that are respectively collected with a preset first exposure duration and a preset second exposure duration by one or more tracking cameras arranged on a head-mounted display device are acquired, the one or more images of even frames at least containing blobs corresponding to multiple luminous bodies arranged on a gamepad; Degree of Freedom (DoF) information of the head-mounted display device is determined according to the one or more images of odd frames and attitude information of the head-mounted display device; and DoF information of the gamepad is determined according to the one or more images of even frames, attitude information of the gamepad, and the DoF information of the head-mounted display device.

20 Claims, 3 Drawing Sheets

(51) Int. Cl.
  *G06T 7/292*     (2017.01)
  *A63F 13/24*     (2014.01)
  *G06T 7/246*     (2017.01)
  *G06F 3/01*      (2006.01)

(52) U.S. Cl.
  CPC ............... *G06T 7/246* (2017.01); *G06T 7/73* (2017.01); *G06T 2207/10144* (2013.01); *G06T 2207/10152* (2013.01); *G06T 2207/20081* (2013.01); *G06T 2207/20084* (2013.01); *G06T 2207/30244* (2013.01)

(58) Field of Classification Search
  CPC ......... G06T 19/006; G06T 2207/10144; G06T 2207/10152; G06T 2207/30204; G06T 2207/30244; G06F 3/012; G06F 3/0308; G06F 3/0346
  See application file for complete search history.

(56) References Cited

FOREIGN PATENT DOCUMENTS

| | | |
|---|---|---|
| CN | 109445596 A | 3/2019 |
| CN | 110622107 A | 12/2019 |
| CN | 112286343 A | 1/2021 |

\* cited by examiner

LOCALIZATION AND TRACKING METHOD AND PLATFORM, HEAD-MOUNTED DISPLAY SYSTEM, AND COMPUTER-READABLE STORAGE MEDIUM

CROSS-REFERENCE TO RELATED APPLICATION

This application is a continuation of PCT International Application No. PCT/CN2021/114364 filed on Aug. 24, 2021, which claims priority to Chinese Patent Application No. 202010974857.9, filed to the China National Intellectual Property Administration (CNIPA) on Sep. 16, 2020 and entitled "Localization and Tracking Method and Platform, and Head-Mounted Display System", the present disclosure of which is hereby incorporated by reference in its entirety.

TECHNICAL FIELD

Embodiments of the present disclosure relate to the field of video processing technologies, in particular to a localization and tracking method, a localization and tracking platform, a head-mounted display system, and a computer-readable storage medium.

BACKGROUND

A localization (also referred to as positioning) technology has been widely applied to fields such as Virtual Reality (VR), Augmented Reality (AR), and Mixed Reality (MR), and is an important part of man-machine interaction.

At present, when realizing tracking of a gamepad, electromagnetic sensors or ultrasonic sensors are usually required to be arranged on the gamepad so as to realize localization and tracking of the gamepad. When realizing bare-hand tracking, infrared cameras or depth cameras are required to be added on a head-mounted display device. Based on this, localization and tracking of the head-mounted display device, the gamepad, and bare hands cannot be realized based on the same camera, with problems of high power consumption, poor stability, and high cost during use.

Therefore, a localization and tracking solution is required to realize synchronous tracking of the head-mounted display device and the gamepad.

SUMMARY

Embodiments of the present disclosure provide a technical solution of synchronous tracking of a head-mounted display device and a gamepad.

According to a first aspect of the embodiments of the present disclosure, a localization and tracking method is provided, which includes the following operations.

One or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device are acquired, the one or more images of even frames at least containing blobs corresponding to multiple luminous bodies arranged on a gamepad, and the gamepad being in communication connection with the head-mounted display device.

Degree of Freedom (DoF) information of the head-mounted display device is determined according to the one or more images of odd frames and attitude information of the head-mounted display device.

DoF information of the gamepad is determined according to the one or more images of even frames, attitude information of the gamepad, and the DoF information of the head-mounted display device.

In at least one exemplary embodiment, the preset second exposure duration is less than the first exposure duration.

In at least one exemplary embodiment, the first exposure duration is adaptively adjusted according to an intensity of ambient light.

In at least one exemplary embodiment, at least two tracking cameras are arranged on the head-mounted display device, exposure durations of respective tracking cameras having a same center point.

In at least one exemplary embodiment, the operation that one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device are acquired includes the following operations.

Multiple images of odd frames are collected, by the at least two tracking cameras, with the preset first exposure duration, each image of odd frame corresponding to each tracking camera; and multiple images of even frames are collected, by the at least two tracking cameras, with the preset second exposure duration, each image of even frame corresponding to each tracking camera.

In at least one exemplary embodiment, the method may further include the following operations.

The luminous bodies on the gamepad are controlled to be turned on according to a preset lighting duration when the one or more images of even frames are collected with the preset second exposure duration by the one or more tracking cameras arranged on the head-mounted display device, a middle time of the preset second exposure duration corresponding to a middle time of the preset lighting duration.

In at least one exemplary embodiment, the preset lighting duration is greater than or equal to the preset second exposure duration.

In at least one exemplary embodiment, the operation that DoF information of the head-mounted display device is determined according to the one or more images of odd frames and attitude information of the head-mounted display device includes the following operations.

Calculation is performed by a Simultaneous Localization and Mapping (SLAM) algorithm according to spatial structure information in the one or more images of odd frames, to obtain DoF of translational movement of the head-mounted display device.

DoF of rotational movement of the head-mounted display device is obtained according to the attitude information of the head-mounted display device that is collected by a first Inertial Measurement Unit (IMU) integrated in the head-mounted display device.

The DoF information of the head-mounted display device is determined based on the DoF of translational movement and the DoF of rotational movement.

In at least one exemplary embodiment, after the operation that DoF information of the head-mounted display device is determined according to the one or more images of odd frames and attitude information of the head-mounted display device, the method may further include the following operations.

Pre-integration is performed on the DoF information of the head-mounted display device with reference to the attitude information of the head-mounted display device to obtain high-frequency DoF information of the head-mounted display device.

In at least one exemplary embodiment, the operation that DoF information of the gamepad is determined according to the one or more images of even frames, attitude information of the gamepad, and the DoF information of the head-mounted display device includes the following operations.

Blob detection is performed on the one or more images of even frames to determine position information of all the blobs in the one or more images of even frames.

Three-dimensional coordinates of the luminous bodies on the gamepad corresponding to the blobs in the one or more images of even frames are determined according to the position information of all the blobs in the one or more images of even frames.

The DoF information of the gamepad is determined according to the three-dimensional coordinates of the luminous bodies on the gamepad corresponding to the blobs in the one or more images of even frames, the attitude information of the gamepad, and the DoF information of the head-mounted display device.

In at least one exemplary embodiment, the operation that blob detection is performed on the one or more images of even frames to determine position information of all the blobs in the one or more images of even frames includes the following operations.

Blob detection is performed on each of the one or more images of even frames that are collected by the one or more tracking cameras to determine the position information of all the blobs in each of the one or more images of even frames, herein the position information of all the blobs at least includes position information of four blobs.

A correspondence between the blobs in the one or more images of even frames and the luminous bodies on the gamepad is determined according to a distribution rule of each blob in the one or more images of even frames.

The three-dimensional coordinates of corresponding luminous bodies on the gamepad are determined based on two-dimensional coordinates of the corresponding luminous bodies on the gamepad.

In at least one exemplary embodiment, the operation that the DoF information of the gamepad is determined according to the three-dimensional coordinates of the luminous bodies on the gamepad corresponding to the blobs in the one or more images of even frames, the attitude information of the gamepad, and the DoF information of the head-mounted display device includes the following operations.

DoF of translational movement is determined according to the three-dimensional coordinates of the luminous bodies on the gamepad corresponding to the blobs in the one or more images of even frames.

DoF of rotational movement of the gamepad is determined according to the attitude information of the gamepad.

The DoF information of the gamepad is determined according to the DoF of translational movement and the DoF of rotational movement.

Coordinate transformation is performed on the DoF information of the gamepad according to the DoF information of the head-mounted display device.

In at least one exemplary embodiment, after the operation that the DoF information of the gamepad is determined according to the three-dimensional coordinates of the luminous bodies on the gamepad corresponding to the blobs in the one or more images of even frames, the attitude information of the gamepad, and the DoF information of the head-mounted display device, the method may further include the following operations.

Pre-integration is performed on the DoF information of the gamepad with reference to the attitude information of the gamepad to obtain high-frequency DoF information of the gamepad.

In at least one exemplary embodiment, the one or more images of odd frames at least contain hand or hands, and the method may further include the following operations.

DoF information of the hand or hands is determined according to the one or more images of odd frames.

In at least one exemplary embodiment, the operation that DoF information of the hand or hands is determined according to the one or more images of odd frames includes the following operations.

The one or more images of odd frames are input to a preset convolutional neural network model to obtain positions of multiple key points of the hand or hands.

The DoF information of the hand or hands is determined according to the positions of the multiple key points of the hand or hands.

In at least one exemplary embodiment, the method may further include the following operations of training the preset convolutional neural network model.

Multiple scenario images are collected, the scenario images containing hand or hands.

The positions of the multiple key points of the hand or hands in the multiple scenario images are marked, and an image training sample set is formed with the multiple marked scenario images.

The convolutional neural network model is trained according to the image training sample set.

According to a second aspect of the embodiments of the present disclosure, a localization and tracking platform is provided, which includes an image acquisition module, a localization and tracking module, and a localization and tracking module.

The image acquisition module is configured to acquire one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device, the one or more images of even frames at least containing blobs corresponding to multiple luminous bodies arranged on a gamepad, and the gamepad being in communication connection with the head-mounted display device.

The localization and tracking module is configured to determine DoF information of the head-mounted display device according to the one or more images of odd frames and attitude information of the head-mounted display device.

The localization and tracking module is further configured to determine DoF information of the gamepad according to the one or more images of even frames, attitude information of the gamepad, and the DoF information of the head-mounted display device.

Or, the localization and tracking platform includes a processor and a memory, the memory storing a computer instruction, and when the computer instruction is executed by the processor, the processor performing the method of any one of the first aspect of the embodiments of the present disclosure.

According to a third aspect of the embodiments of the present disclosure, a head-mounted display system is provided, which may include a head-mounted display device, a gamepad connected to the head-mounted display device, and a localization and tracking platform, at least two tracking cameras are arranged on the head-mounted display device, and the gamepad is provided with multiple luminous bodies.

In at least one exemplary embodiment, exposure durations of respective tracking cameras arranged on the head-mounted display device have a same center point.

In at least one exemplary embodiment, four tracking cameras are arranged on the head-mounted display device, the four tracking cameras are arranged in the head-mounted display device according to a preset first position constraint rule, and the preset first position constraint rule is used for ensuring that each tracking camera meets requirements of the head-mounted display device on Field Angle Of View (FOV).

In at least one exemplary embodiment, multiple luminous bodies are arranged on the gamepad according to a preset second position constraint rule, that being arranged according to the preset second position constraint rule meets the following conditions: coincidence or adhesion of local pattern information in images collected within a preset distance range from the tracking cameras to the gamepad does not occur, and blobs corresponding to at least four luminous bodies are presented in every image collected by the one or more tracking cameras at any angles.

According to a fourth aspect of the present disclosure, a computer-readable storage medium is provided. The computer-readable storage medium has a computer program stored thereon. When the computer program is executed by a processor, the method as described in any one of the foregoing method embodiments and exemplary embodiments is implemented.

According to the embodiments of the present disclosure, the one or more images of odd frames that are collected with the preset first exposure duration by the one or more tracking cameras arranged on the head-mounted display device as well as the one or more images of even frames that are collected with the preset second exposure duration by the one or more tracking cameras arranged on the head-mounted display device are acquired, Six Degrees of Freedom (6DoF) information of the head-mounted display device is determined according to the one or more images of odd frames and the attitude information of the head-mounted display device, 6DoF information of the gamepad is determined according to the one or more images of even frames and the attitude information of the gamepad, and thus synchronous tracking of the head-mounted display device and the gamepad is realized based on the same hardware without the need of additional hardware, thereby reducing power consumption of the head-mounted display device and bringing better user experience.

Through the following detailed description of the exemplary embodiments of the present disclosure with reference to the accompanying drawings, other features and advantages of the present disclosure will become clear.

BRIEF DESCRIPTION OF THE DRAWINGS

In order to describe the technical solutions in the embodiments of the present disclosure more clearly, the drawings required to be used in descriptions about the embodiments will be simply introduced below. It is to be understood that the drawings below only illustrates some embodiments of the present disclosure, and thus should not be considered as limiting the scope. For those having ordinary skill in the art, other drawings may also be obtained from these drawings without involving any inventive effort.

DETAILED DESCRIPTION OF THE EMBODIMENTS

Various exemplary embodiments of the present disclosure will be described below in detail with reference to the accompanying drawings. It is to be noted that, unless specifically described otherwise, relative arrangements, numerical expressions, and numerical values of components and operations set forth in these embodiments do not limit the scope of the present disclosure.

The description below to at least one exemplary embodiment is actually only illustrative, and should not be taken as any limitation to the present disclosure and application or use thereof.

The technologies, methods, and devices known to those having ordinary skill in the related art may not be discussed in detail, but where appropriate, the technologies, methods, and devices should be regarded as part of the specification.

In all the examples shown and discussed herein, any specific value should be interpreted as merely exemplary, rather than as a limitation. Therefore, other examples of the exemplary embodiments may have different values.

It is to be noted that similar reference numerals and letters indicate similar items in the drawings below, and thus, once an item is defined in one figure, further discussion thereon is omitted in the following figures.

Hardware Configuration

Figure 1:
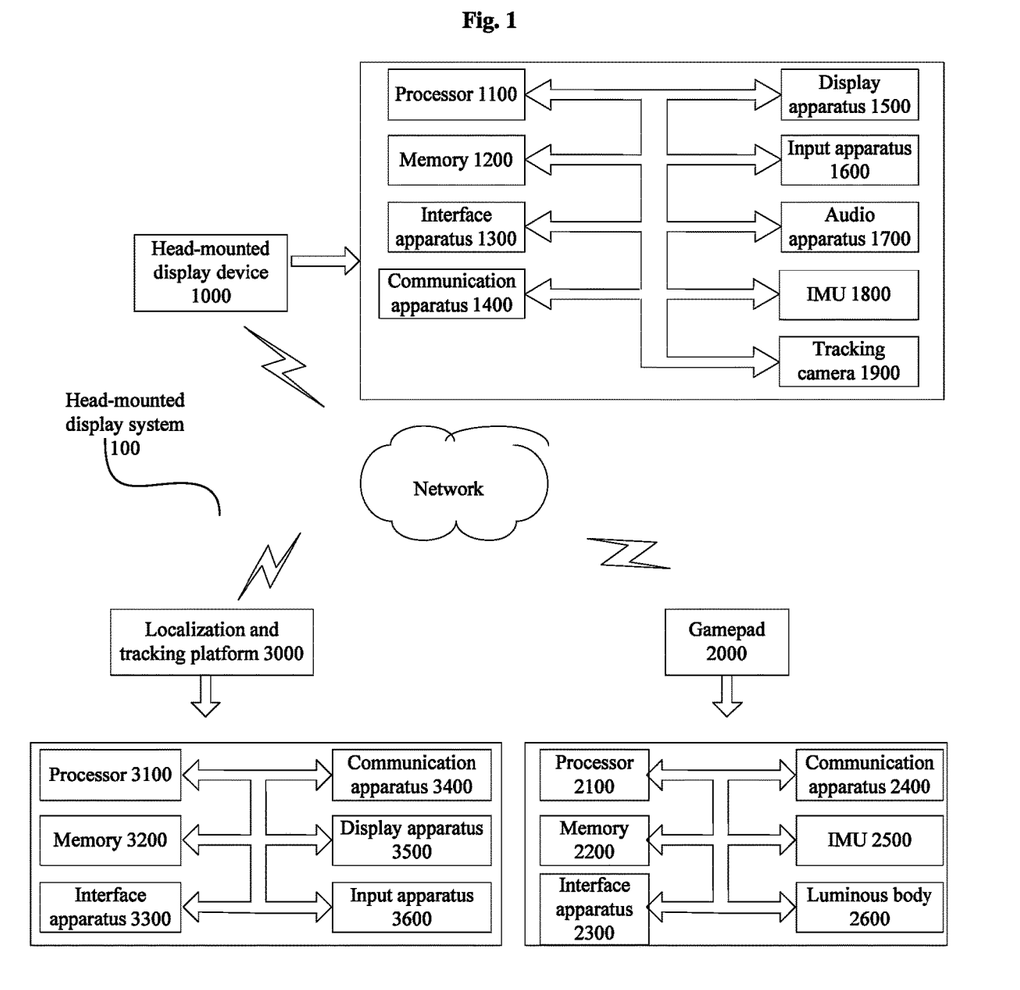
FIG. 1 is a schematic diagram of hardware configuration that may be applied to implementing a head-mounted display system according to some embodiments of the present disclosure.

FIG. 1 is a block diagram of hardware configuration of a head-mounted display system 100 according to some embodiments of the present disclosure.

Referring to FIG. 1, the head-mounted display system 100 includes a head-mounted display device 1000, a gamepad 2000, and a localization and tracking platform 3000. The localization and tracking platform 3000 is in communication connection with the head-mounted display device 1000 and the gamepad 2000 respectively to realize localization and tracking of the head-mounted display device 1000 and the gamepad 2000.

The head-mounted display device 1000 may be, for example, a VR device, an AR device, a MR device, or the like.

In an embodiment, the head-mounted display device 1000 may include, as shown in FIG. 1, a processor 1100, a memory 1200, an interface apparatus 1300, a communication apparatus 1400, a display apparatus 1500, an input apparatus 1600, an audio apparatus 1700, an IMU 1800, one or more tracking cameras 1900, or the like.

The processor 1100 may be, for example, a Central Processing Unit (CPU), a microprocessor Microprogrammed Control Unit (MCU), or the like. The memory 1200 includes, for example, a Read Only Memory (ROM), a Random Access Memory (RAM), a nonvolatile memory such as a hard disk, and the like. The interface apparatus 1300 includes, for example, a serial bus interface (including a USB interface), a parallel bus interface, a High-Definition Multimedia Interface (HDMI) interface, and the like. The communication device 1400 can, for example, perform wired or wireless communication. The display apparatus 1500 is, for example, a liquid crystal display, a Light Emitting Diode (LED) display screen, a touch display, and the like. The input apparatus 1600 includes, for example, a touch screen, a motion sensing input, and the like. The audio apparatus 1700 may be configured to input/output voice information. The IMU 1800 may be configured to measure change of pose of the head-mounted display device 1000. The one or more tracking cameras 1900 may be configured to acquire image information. For example, at least two tracking cameras 1900 may be arranged.

In an embodiment, each of the one or more tracking cameras 1900 may be a tracking camera with a large viewing angle, for example, a horizontal FOV of each of the one or more tracking cameras 1900 ranges from 100° to 160°, a vertical FOV of each of the one or more tracking cameras 1900 ranges from 80° to 120°, a depth FOV of each of the one or more tracking cameras 1900 ranges from 130° to 160°, a frame rate of each of the one or more tracking cameras 1900 is greater than 60 Hz, a resolution of each of the one or more tracking cameras 1900 is Video Graphics Array (VGA) or 720 P, each of the one or more tracking cameras 1900 adopts an exposure mode of Global Shutter, and is sensitive to a visible light band and an infrared light band. For example, the model of each of the one or more tracking cameras 1900 is OV7251 or OV9282.

Although multiple apparatus are shown for the head-mounted display device 1000 in FIG. 1, the embodiments of the present disclosure may only involve some of the apparatus.

In an embodiment, the gamepad 2000 may include, as shown in FIG. 1, a processor 2100, a memory 2200, an interface apparatus 2300, a communication apparatus 2400, an IMU 2500, luminous bodies 2600, or the like.

The processor 2100 may be, for example, a CPU, a microprocessor MCU, or the like. The memory 2200 includes, for example, an ROM, an RAM, a nonvolatile memory such as a hard disk, and the like. The interface apparatus 2300, for example, includes a serial bus interface (including a USB interface), a parallel bus interface, an HDMI interface, and the like. The communication device 2400 can, for example, perform wired or wireless communication. The IMU 2500 may be configured to measure change of pose of the head-mounted display device 1000. The multiple luminous bodies 2600 may be arranged for recognition of the gamepad. Each of the luminous body 2600 may be, for example, a visible light source or an infrared light source, such as an LED. Although multiple apparatus are shown for the gamepad 2000 in FIG. 1, the embodiments of the present disclosure may only involve some of the apparatus.

The localization and tracking platform 3000 may be, for example, a mobile terminal. In an embodiment, the localization and tracking platform 3000 may include, as shown in FIG. 1, a processor 3100, a memory 3200, an interface apparatus 3300, a communication apparatus 3400, a display apparatus 3500, or an input apparatus 3600. The processor 3100 may be a desktop processor, a mobile processor, or the like, which meets performance requirements, and is not limited herein. The memory 3200 includes, for example, an ROM, an RAM, a nonvolatile memory such as a hard disk, and the like. The interface apparatus 3300, for example, includes various bus interfaces, such as a serial bus interface (including a USB interface), a parallel bus interface, an HDMI interface, and the like. The communication device 3400 can, for example, perform wired or wireless communication. The display apparatus 3500 is, for example, a liquid crystal display, an LED display screen, a touch display, and the like. The input device 3600 may include, for example, a touch screen, a keyboard, or the like. In another embodiment, the localization and tracking platform 3000 may also include a loudspeaker, a microphone, or the like, which is not limited herein. Although multiple apparatus are shown for the localization and tracking platform 3000 in FIG. 1, the embodiments of the present disclosure may only involve some of the apparatus. For example, the localization and tracking platform 3000 may only involve the memory 3200 and the processor 3100.

In an embodiment, the memory 3200 of the localization and tracking platform 3000 is configured to store an instruction, and the instruction is used to control the processor 3100 to execute corresponding operations, so as to provide related support for the localization and tracking method of the embodiments.

It is to be understood that although FIG. 1 only shows a head-mounted display device 1000, a gamepad 2000, and a localization and tracking platform 3000, it does not mean to limit their respective numbers. The head-mounted display system 100 may include multiple head-mounted display devices 1000, multiple gamepads 2000, and multiple localization and tracking platforms 3000.

In the above description, those having ordinary skill in the art may design the instruction according to the solutions provided in the embodiments. How the instruction controls the processor to operate is well known in the art, which will not be described in detail here.

The head-mounted display system shown in FIG. 1 is only explanatory, and is by no means intended to limit the present disclosure and the applications or use of the present disclosure.

Method Embodiments

Figure 2:
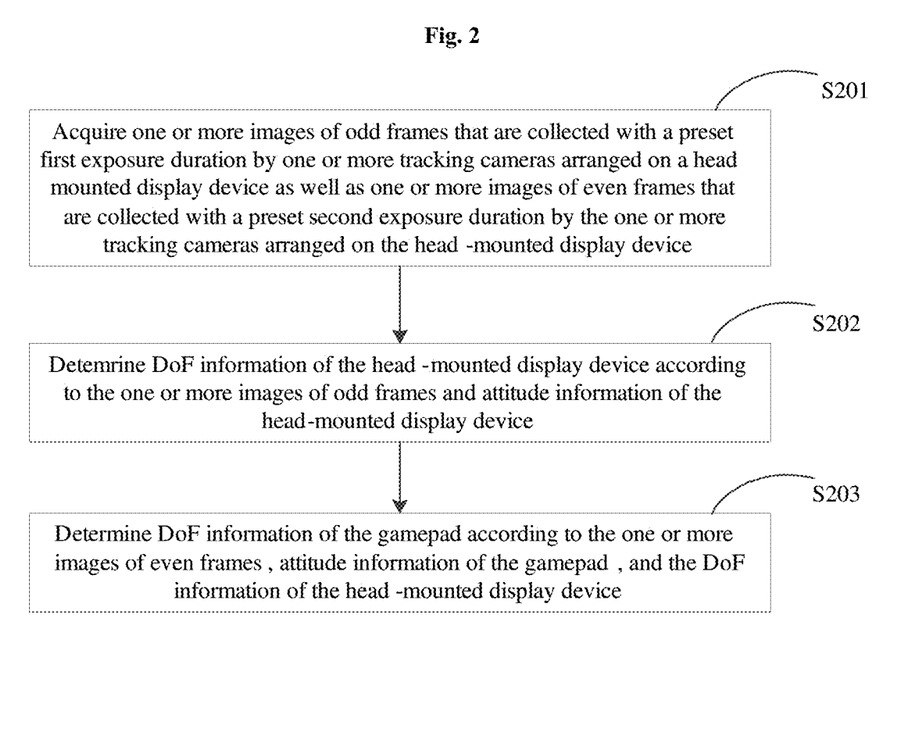
FIG. 2 is a flow diagram of a localization and tracking method according to some embodiments of the present disclosure.

Referring to FIG. 2, a localization and tracking method according to some embodiments of the present disclosure is described. The method is applied to a localization and tracking platform, and the localization and tracking platform is connected to a head-mounted display device and a gamepad, respectively. The localization and tracking method includes the following operations from S201 to S203.

In S201, one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device are acquired, the one or more images of even frames at least containing blobs corresponding to multiple luminous bodies arranged on a gamepad, and the gamepad being in communication connection with the head-mounted display device.

In some embodiments of the present disclosure, at least two tracking cameras which are used to acquire images are arranged on the head-mounted display device. In an embodiment, the one or more tracking cameras may collect images with different exposure durations, for example, collect images of odd frame with a preset first exposure duration and collect images of even frames with a preset second exposure duration. At least two tracking cameras collect at the same time, that is, the exposure durations of each tracking camera have the same center point.

In a more specific example, four tracking cameras are arranged on the head-mounted display device, the four tracking cameras are arranged in the head-mounted display device according to a preset first position constraint rule, thereby ensuring that each tracking camera meets requirements of the head-mounted display device on FOV. According to the embodiments of the present disclosure, the head-mounted display device and the gamepad are subjected to localization and tracking through the images collected by the four tracking cameras, so that the robustness and the accuracy of localization and tracking can be improved.

Figure 3:
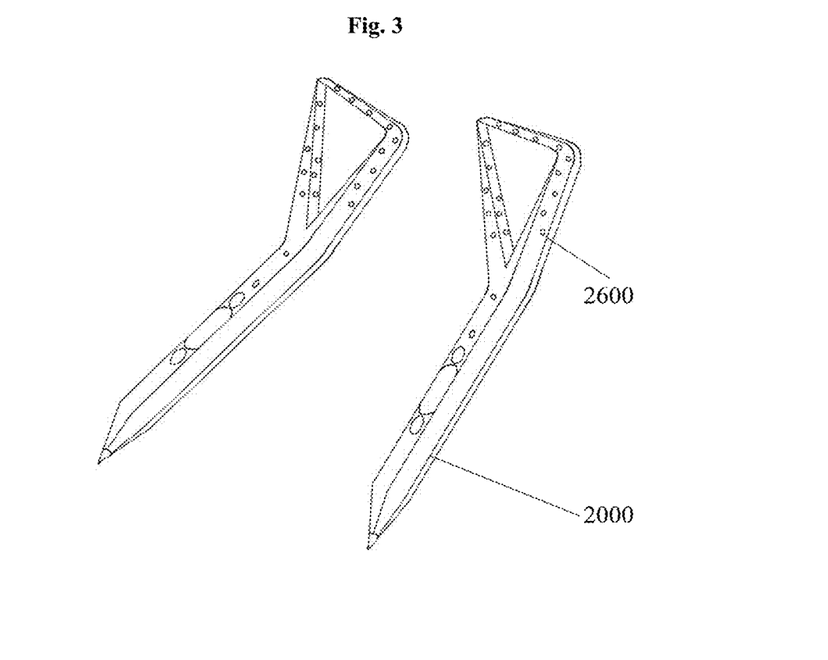
FIG. 3 is a schematic diagram of a gamepad according to some embodiments of the present disclosure.

Referring to FIG. 3, multiple luminous bodies 2600 are arranged on the gamepad 2000. The multiple luminous bodies are arranged according to a preset second position constraint rule, so that coincidence or adhesion of local pattern information in images collected when the camera is closer to the gamepad, and it can be ensured that blobs corresponding to at least four luminous bodies are presented in every image collected by the one or more tracking cameras at any angles, and thus the gamepad can be positioned according to the collected images. In a specific example, the multiple luminous bodies are not on the same plane. In a more specific example, 17 or 24 luminous bodies are arranged. The luminous body may be, for example, a visible light source or an infrared light source, such as an LED.

Based on the head-mounted display device and the gamepad described above, by the localization and tracking method provided in some embodiments of the present disclosure, DoF information of the head-mounted display device can be determined according to the images collected by the at least two tracking cameras and attitude information of the head-mounted display device, and the DoF information of the gamepad can be determined according to the images collected by the at least two tracking cameras and attitude information of the gamepad.

In some embodiments of the present disclosure, at least two tracking cameras collect images with the preset first exposure duration and the preset second exposure duration alternately, that is, multiple images of odd frames are collected, by the at least two tracking cameras, with the preset first exposure duration, each image of odd frame corresponding to each tracking camera; and multiple images of even frames are collected, by the at least two tracking cameras, with the preset second exposure duration, each image of even frame corresponding to each tracking camera. The images of odd frames are used for determination of the DoF information of the head-mounted display device. The images of even frames are used for determination of the DoF information of the gamepad.

The longer the exposure duration of the tracking camera is, the more information about the ambient light is acquired during image acquisition. In an embodiment, the first exposure duration may be adaptive to the ambient light, that is, the first exposure duration may be adaptively adjusted according to an intensity of the ambient light. According to the embodiments of the present disclosure, the DoF information of the head-mounted display device is determined according to the one or more images of odd frames collected with the preset first exposure duration, so that more features of the external environment can be acquired, and the accuracy in tracking the head-mounted display device can be improved.

In an embodiment, the preset second exposure duration is less than the first exposure duration. One or more images of even frames are collected with the preset second exposure duration, the one or more images of even frames at least containing blobs corresponding to multiple luminous bodies arranged on a gamepad. The preset second exposure duration may be preset. According to the embodiments of the present disclosure, the one or more images of even frames are collected with the preset second exposure duration that is smaller, and thus the blobs corresponding to the multiple luminous bodies arranged on the gamepad can be presented while avoiding acquiring excessive information of the ambient light, which can reduce interference from the ambient light, improve quality of images of even frames, and improve accuracy in tracking the gamepad.

In a more specific example, the localization and tracking method further includes that: the luminous bodies on the gamepad are controlled to be turned on according to a preset lighting duration when the one or more images of even frames are collected with the preset second exposure duration by the one or more tracking cameras arranged on the head-mounted display device, a middle time of the preset second exposure duration corresponding to a middle time of the preset lighting duration.

The middle time of the preset second exposure duration is synchronous with the middle time of the preset lighting duration, that is, the luminous bodies on the gamepad are controlled to light within an exposure duration during which the one or more tracking cameras collects the one or more images of even frames, which can ensure that the blobs corresponding to the multiple blobs arranged on the gamepad are contained in the one or more images of even frames.

The preset lighting duration of the luminous bodies of the gamepad may be set according to the preset second exposure duration. According to the embodiments of the present disclosure, since the preset lighting duration of the luminous bodies on the gamepad is set according to the preset second exposure duration that is shorter, the preset lighting duration of the luminous bodies of the gamepad can be shortened, thereby reducing device power consumption.

In an embodiment, the preset lighting duration may be equal to the preset second exposure duration, that is, a start point and an end point of the preset second exposure duration correspond to the a start point and an end point of the preset lighting duration. For example, the preset lighting duration may be 100 μs. In another embodiment, the preset lighting duration may be greater than the preset second exposure duration, that is, the preset lighting duration of the luminous bodies is set to be longer than the preset second exposure duration by extending by a certain time relative to the start point and the end point of the preset second exposure duration. For example, the preset lighting duration of the luminous bodies is extended by 30 μs relative to the start point and the end point of the preset second exposure duration. According to the embodiments of the present disclosure, the preset lighting duration is greater than the preset second exposure duration, so that accuracy error caused when a wireless communication mode is adopted to synchronously control the tracking cameras to collect the one or more images of even frames and the luminous bodies of the gamepad to light can be avoided, thereby ensuring that the tracking cameras can collect the one or more images of even frames while capturing the blobs generated from the luminous bodies.

After the operation that one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device are acquired, S202 is performed.

In S202, DoF information of the head-mounted display device is determined according to the one or more images of odd frames and attitude information of the head-mounted display device.

A first IMU is integrated in the head-mounted display device, and the first IMU is configured to collect the attitude information of the head-mounted display device.

The DoF information of the head-mounted display device may be, for example, 6DoF information of the head-mounted display device, including DoF of translational movement and DoF of rotational movement.

In an embodiment, calculation is performed by an SLAM algorithm according to spatial structure information in the one or more images of odd frames, so that the DoF of translational movement (i.e., three-dimensional coordinates) of the head-mounted display device can be obtained; the DoF of rotational movement (i.e., yaw angle, pitch angle, and roll angle) of the head-mounted display device can be obtained according to the attitude information (for example, quaternion information) of the head-mounted display device that is collected by the first IMU. The 6DoF information of the head-mounted display device is determined based on the DoF of translational movement and the DoF of rotational movement.

In an embodiment, after the 6DoF information of the head-mounted display device is determined, the localization and tracking method may further include that pre-integration is performed on the 6DoF information of the head-mounted display device with reference to the attitude information of the head-mounted display device to obtain high-frequency 6DoF information of the head-mounted display device.

An output frequency of the 6DoF information of the head-mounted display device depends on a frequency at which the first IMU collects attitude information of the head-mounted display device and a frequency at which the one or more tracking cameras collect the one or more images of odd frames. The first IMU collects attitude information of the head-mounted display device at a high frequency, which is 200 Hz generally. According to the embodiments of disclosure, pre-integration is performed on the 6DoF information of the head-mounted display device with reference to the attitude information of the head-mounted display device to obtain the high-frequency 6DoF information of the head-mounted display device, so that a delay can be reduced and user experience can be improved.

After determination of the DoF information of the head-mounted display device, S203 is performed.

In S203, DoF information of the gamepad is determined according to the one or more images of even frames, attitude information of the gamepad, and the DoF information of the head-mounted display device.

A second IMU is integrated in the gamepad, and is configured to collect the attitude information of the gamepad.

The DoF information of the gamepad may be, for example, 6DoF information of the gamepad, including DoF of translational movement and DoF of rotational movement.

In an embodiment, the operation that DoF information of the gamepad is determined according to the one or more images of even frames, attitude information of the gamepad, and the DoF information of the head-mounted display device may further include S301 to S303.

In S301, blob detection is performed on the one or more images of even frames to determine position information of all the blobs in the one or more images of even frames.

In S302, three-dimensional coordinates of the luminous bodies on the gamepad corresponding to the blobs in the one or more images of even frames are determined according to the position information of all the blobs in the one or more images of even frames.

Blob detection is performed on each of the one or more images of even frames collected by the one or more tracking cameras to determine position information (two-dimensional coordinates) of all blobs in each of the one or more images of even frames. Herein, the position information of all the blobs at least includes position information of four blobs. A correspondence between the blobs in the one or more images of even frames and the luminous bodies on the gamepad is determined according to a distribution rule of each blob in the one or more images of even frames. The three-dimensional coordinates of corresponding luminous bodies on the gamepad are determined based on the two-dimensional coordinates of the corresponding luminous bodies on the gamepad.

In S303, the DoF information of the gamepad is determined according to the three-dimensional coordinates of the luminous bodies on the gamepad corresponding to the blobs in the one or more images of even frames, the attitude information of the gamepad, and the DoF information of the head-mounted display device.

DoF of translational movement of the gamepad may be determined according to the three-dimensional coordinates of the luminous bodies on the gamepad corresponding to the blobs in the one or more images of even frames. DoF of rotational movement of the gamepad may be determined according to the attitude information of the gamepad. 6DOF information of the gamepad may be determined according to the DoF of translational movement and the DoF of rotational movement. After that, coordinate transformation is performed on the 6DoF information of the gamepad according to the DoF information of the head-mounted display device.

In an embodiment, after the three-dimensional coordinate of each luminous body is determined, a Perspective-n-Point (PNP) algorithm or other related algorithms in the related art may be adopted with reference to the attitude information of the gamepad collected by the second IMU to determine 6DoF information of the gamepad, thereby realizing localization and tracking of the gamepad.

According to the embodiments of the present disclosure, multiple images of even frames are collected by at least two tracking cameras. Since the 6DoF information of the gamepad is resolved according to the multiple images of even frames, the robustness can be improved, and thus the tracking accuracy can be improved.

In an embodiment, after the 6DoF information of the gamepad is determined, the localization and tracking method may further include that pre-integration is performed on the 6DoF information of the gamepad with reference to the attitude information of the gamepad to obtain high-frequency 6DoF information of the gamepad.

An output frequency of the 6DoF information of the gamepad depends on a frequency at which the second IMU collects the attitude information of the gamepad and a frequency at which the one or more tracking cameras collect the one or more images of even frames. The second IMU collects the attitude information of the gamepad at a high frequency, which is 200 Hz generally. According to the embodiments of disclosure, pre-integration is performed on the 6DoF information of the gamepad with reference to the attitude information of the gamepad to obtain high-frequency 6DoF information of the gamepad, so that delay can be reduced and user experience can be improved.

According to the embodiments of the present disclosure, the one or more images of odd frames that are collected with the preset first exposure duration by the one or more tracking cameras arranged on the head-mounted display device as well as the one or more images of even frames that are collected with the preset second exposure duration by the one or more tracking cameras arranged on the head-mounted display device are acquired, the 6DoF information of the head-mounted display device is determined according to the one or more images of odd frames and the attitude information of the head-mounted display device, the 6DoF information of the gamepad is determined according to the one or more images of even frames and the attitude information of the gamepad, and thus synchronous tracking of the head-mounted display device and the gamepad is realized based on the same hardware without the need of additional hardware, thereby reducing power consumption of the head-mounted display device and bringing better user experience.

In some scenarios, a user attempts to perform selection settings of some menus and/or interact with objects in some virtual scenarios, such as in a main interface, with bare hands. In such case, bare-hand tracking may also be realized in some embodiments of the present disclosure. The specific description is as follows.

In some embodiments, the one or more images of odd frames at least contain hand or hands. The localization and tracking method may further include that DoF information of the hand or hands is determined according to the one or more images of odd frames. According to the embodiments of the present disclosure, tracking of the user's hand or hands can be realized under the condition that the user does not use the gamepad.

In an embodiment, the operation of determining DoF information of the hand or hands according to the one or more images of odd frames may further include S401 to S402.

In S401, the one or more images of odd frames are input to a preset convolutional neural network model to obtain positions of multiple key points of the hand or hands.

In S402, the DoF information of the hand or hands is determined according to the positions of the multiple key points of the hand or hands.

The DoF information of the hand or hands may be, for example, 26DoF information.

In an embodiment, the localization and tracking method may further include an operation of training the preset convolutional neural network model. The operation of training the preset convolutional neural network model may further include S501 to S503.

In S501, multiple scenario images are collected, the scenario images containing hand or hands.

For example, image data that are of different sizes and contain the hand or hands are collected from 200 persons in different light environments and different service scenarios by one or more tracking cameras in four channels. For example, 1.25 million scenario images containing hand or hands are collected.

In S502, positions of the multiple key points of the hand or hands in the multiple scenario images are marked, and an image training sample set is formed with the multiple marked scenario images.

In S503, the convolutional neural network model is trained according to the image training sample set.

For example, positions of 24 key points of the hand or hands in multiple scenario images are marked, and the marked images form an image training sample set. The positions of multiple estimated key points on the multiple scenario images are estimated according to the convolutional neural network model. An optimized residual equation is constructed, the error of a distance between the position of the estimated key pint on the image corresponding to the convolutional neural network model and the position of the marked key point on the image is minimized so as to obtain the trained convolutional neural network.

According to the embodiments of the present disclosure, the 26 DoF information of the hand or hands can be determined rapidly based on the convolutional neural network model.

According to the embodiments of the present disclosure, the one or more images of odd frames that are collected with the preset first exposure duration by the one or more tracking cameras arranged on the head-mounted display device as well as the one or more images of even frames that are collected with the preset second exposure duration by the one or more tracking cameras arranged on the head-mounted display device are acquired, the 6 DoF information of the head-mounted display device is determined according to the one or more images of odd frames and the attitude information of the head-mounted display device, the 6 DoF information of the gamepad is determined according to the one or more images of even frames and the attitude information of the gamepad; when the user does not use the gamepad, the 6 DoF information of the head-mounted display device is determined according to the one or more images of odd frames and the attitude information of the head-mounted display device, and the 26 DoF information of the user's hand or hands is determined according to the one or more images of odd frames. The localization and tracking method provided in some embodiments of the present disclosure realizes synchronous tracking of the head-mounted display device, the gamepad, and the bare hands based on the same hardware, thereby reducing power consumption of the head-mounted display device and bringing better user experience.

Apparatus Embodiment 1

Figure 4:
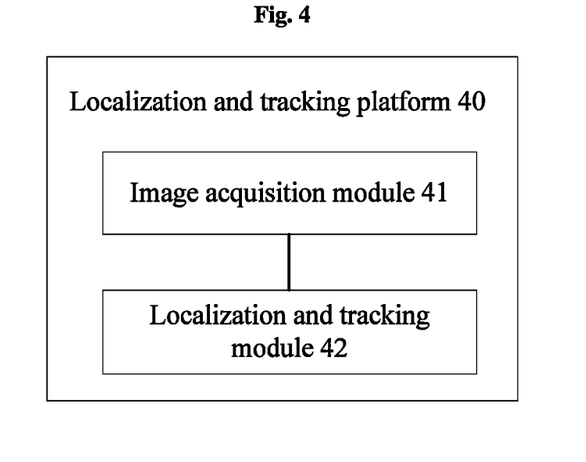
FIG. 4 is a structural block diagram of a localization and tracking platform according to some embodiments of the present disclosure.

Referring to FIG. 4, an embodiment of the present disclosure provides a localization and tracking platform 40. The localization and tracking platform 40 may be the localization and tracking platform 300 shown in FIG. 1, which may be, for example, a mobile terminal. The localization and tracking platform 40 includes an image acquisition module 41 and a localization and tracking module 42.

The image acquisition module 41 is configured to acquire one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device, the one or more images of even frames at least containing blobs corresponding to multiple luminous bodies arranged on a gamepad, and the gamepad being in communication connection with the head-mounted display device;

In an embodiment, the preset second exposure duration is less than the first exposure duration.

In an embodiment, the luminous bodies on the gamepad are controlled to be turned on according to a preset lighting duration when the one or more images of even frames are collected with the preset second exposure duration by the one or more tracking cameras arranged on the head-mounted display device, a middle time of the preset second exposure duration corresponding to a middle time of the preset lighting duration.

In a more specific example, the preset lighting duration is greater than or equal to the preset second exposure duration.

The localization and tracking module 42 is configured to determine DoF information of the head-mounted display device according to the one or more images of odd frames and attitude information of the head-mounted display device.

The localization and tracking module 42 is further configured to determine DoF information of the gamepad according to the one or more images of even frames, attitude information of the gamepad, and the DoF information of the head-mounted display device.

In an embodiment, the localization and tracking module 42 is configured to perform blob detection on the one or more images of even frames to determine position information of all the blobs in the one or more images of even frames.

The localization and tracking module 42 is further configured to determine three-dimensional coordinates of the luminous bodies on the gamepad corresponding to the blobs in the one or more images of even frames according to the position information of all the blobs in the one or more images of even frames.

The localization and tracking module 42 is further configured to determine the DoF information of the gamepad according to the three-dimensional coordinates of the luminous bodies on the gamepad corresponding to the blobs in the one or more images of even frames, the attitude information of the gamepad, and the DoF information of the head-mounted display device.

In an embodiment, the one or more images of odd frames at least contain hand or hands. The localization and tracking module 42 is further configured to determine DoF information of the hand or hands according to the one or more images of odd frames.

In a more specific example, the localization and tracking module 42 is configured to input the one or more images of odd frames to a preset convolutional neural network model to obtain positions of multiple key points of the hand or hands.

The localization and tracking module 42 is further configured to determine the DoF information of the hand or hands according to the positions of the multiple key points of the hand or hands.

In an embodiment, the localization and tracking platform 40 further includes a model training module. The model training module is configured to train the predetermined convolutional neural network model.

In a more specific example, the model training module is configured to collect multiple scenario images, the scenario images containing hand or hands.

The model training module is further configured to mark positions of the multiple key points of the hand or hands in the multiple scenario images, and form an image training sample set with the multiple marked scenario images.

The model training module is further configured to train the convolutional neural network model according to the image training sample set.

Figure 5:
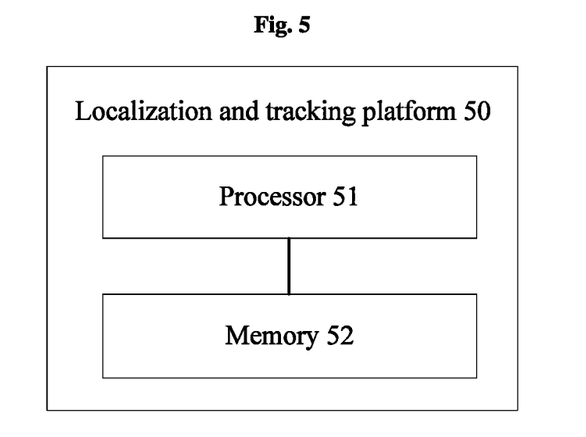
FIG. 5 is a structural block diagram of a localization and tracking platform according to some embodiments of the present disclosure.

Referring to FIG. 5, a localization and tracking platform 50 according to some embodiments of the present disclosure is shown. The localization and tracking platform 50 includes a processor 51 and a memory 52. The memory 52 is configured to store a computer program, and when the computer program is executed by the processor 51, the localization and tracking method provided in any one of the foregoing embodiments is implemented.

Apparatus Embodiment 2

The embodiments of the present disclosure further provide a head-mounted display system. The head-mounted display system includes a head-mounted display device, a gamepad connected to the head-mounted display device, and a localization and tracking platform. The head-mounted display system may be the head-mounted display system 100 as shown in FIG. 1.

In an embodiment, at least two tracking cameras and a first IMU are arranged on the head-mounted display device.

The at least two tracking cameras are configured to collect images. Specifically, multiple images of odd frames are collected, by the at least two tracking cameras, with the preset first exposure duration; and multiple images of even frames are collected, by the at least two tracking cameras, with the preset second exposure duration.

The first IMU is configured to collect attitude information of the head-mounted display device.

In a more specific example, four tracking cameras are arranged on the head-mounted display device, the four tracking cameras are arranged in the head-mounted display device according to a preset first position constraint rule, thereby ensuring that each tracking camera meets requirements of the head-mounted display device on FOV. According to the embodiments of the present disclosure, the head-mounted display device and the gamepad are subjected to localization and tracking according to the images collected by the four tracking cameras, so that the robustness and the accuracy of localization and tracking can be improved.

In a more specific example, each of the one or more tracking cameras 1900 may be a tracking camera with a large viewing angle, for example, a horizontal FOV of each of the one or more tracking cameras 1900 ranges from 100° to 160°, a vertical FOV of each of the one or more tracking cameras 1900 ranges from 80° to 120°, a depth FOV of each of the one or more tracking cameras 1900 ranges from 130° to 160°, a frame rate of each of the one or more tracking cameras 1900 is greater than 60 Hz, a resolution of each of the one or more tracking cameras 1900 is VGA or 720 P, each of the one or more tracking cameras 1900 adopts an exposure mode of Global Shutter, and is sensitive to a visible light band and an infrared light band. For example, the model of each of the one or more tracking cameras 1900 is OV7251 or OV9282.

The gamepad is provided with a second IMU and multiple luminous bodies.

The multiple luminous bodies are arranged according to a preset second position constraint rule, so that coincidence or adhesion of local pattern information in images collected when the camera is closer to the gamepad, and it can be ensured that blobs corresponding to at least four luminous bodies are presented in every image collected by the one or more tracking cameras at any angles, and thus the gamepad can be positioned according to the collected images.

In a more specific example, 17 or 24 luminous bodies are arranged. The luminous body may be, for example, a visible light source or an infrared light source, such as an LED.

The second IMU is configured to collect attitude information of the gamepad.

The localization and tracking platform is configured to be connected to the head-mounted display device and the gamepad to acquire the one or more images of odd frames, the one or more images of even frames, the attitude information of the head-mounted display device, and the attitude information of the gamepad.

The localization and tracking platform is further configured to determine DoF information of the head-mounted display device according to the one or more images of odd frames and attitude information of the head-mounted display device, so as to realize localization and tracking of the head-mounted display device.

In an embodiment, the localization and tracking platform is further configured to determine DoF information of the gamepad according to the one or more images of even frames, attitude information of the gamepad, and the DoF information of the head-mounted display device when the user uses the gamepad.

In an embodiment, the localization and tracking platform is further configured to determine DoF information of the hand or hands according to the one or more images of odd frames so as to realize localization and tracking of the user's hand or hands when the user does not use the gamepad.

In an embodiment, the localization and tracking platform may be the localization and tracking platform 300 as shown in FIG. 1.

In an embodiment, the localization and tracking platform may also be, for example, a mobile terminal.

According to the embodiments of the present disclosure, the one or more images of odd frames that are collected with the preset first exposure duration by the one or more tracking cameras arranged on the head-mounted display device as well as the one or more images of even frames that are collected with the preset second exposure duration by the one or more tracking cameras arranged on the head-mounted display device are acquired, the 6 DoF information of the head-mounted display device is determined according to the one or more images of odd frames and the attitude information of the head-mounted display device, the 6 DoF information of the gamepad is determined according to the one or more images of even frames and the attitude information of the gamepad, and thus synchronous tracking of the head-mounted display device and the gamepad is realized based on the same hardware without the need of additional hardware, thereby reducing power consumption of the head-mounted display device and bringing better user experience.

According to the embodiments of the present disclosure, the one or more images of odd frames that are collected with the preset first exposure duration by the one or more tracking cameras arranged on the head-mounted display device as well as the one or more images of even frames that are collected with the preset second exposure duration by the one or more tracking cameras arranged on the head-mounted display device are acquired. When the user uses the gamepad, the 6 DoF information of the head-mounted display device is determined according to the one or more images of odd frames and the attitude information of the head-mounted display device, and the 6 DoF information of the gamepad is determined according to the one or more images of even frames and the attitude information of the gamepad. When the user does not use the gamepad, the 6 DoF information of the head-mounted display device is determined according to the one or more images of odd frames and the attitude information of the head-mounted display device, and the 26 DoF information of the hand or hands of the user is determined according to the one or more images of even frames. The localization and tracking method provided in some embodiments of the present disclosure realizes synchronous tracking of the head-mounted display device, the gamepad, and the bare hands based on the same hardware, thereby reducing power consumption of the head-mounted display device and bringing better user experience.

The various embodiments in this specification are described in a progressive manner. The same or similar parts between the various embodiments can be referred to each other. Each embodiment focuses on the differences from other embodiments. However, for those having ordinary skill in the art, it is to be clear that the above embodiments can be used alone or in combination with each other as required. In addition, the apparatus embodiments are described briefly as for they correspond to the method embodiments. For relevant details, please refer to the description of the corresponding parts of the method embodiments. The system embodiments described above are merely illustrative, and modules described as separated components may or may not be physically separated.

The present disclosure may be a system, a method and/or a computer program product. The computer program product may include a computer-readable storage medium, in which a computer-readable program instruction configured to enable a processor to implement each aspect of the embodiments of the present disclosure is stored.

The computer-readable storage medium may be a physical device capable of retaining and storing an instruction used by an instruction execution device. For example, the computer-readable storage medium may be, but not limited to, an electric storage device, a magnetic storage device, an optical storage device, an electromagnetic storage device, a semiconductor storage device, or any appropriate combination thereof. More specific examples (non-exhaustive list) of the computer-readable storage medium include a portable computer disk, a hard disk, a RAM, a ROM, an EPROM (or a flash memory), an SRAM, a Compact Disc Read-Only Memory (CD-ROM), a Digital Video Disk (DVD), a memory stick, a floppy disk, a mechanical encoding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the embodiments of the present disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be concatenated to the computer of the user through any type of network including an LAN or a WAN, or may be concatenated to an external computer (for example, concatenated by an Internet service provider through the Internet). In some embodiments, an electronic circuit such as a programmable logic circuit, an FPGA, or a Programmable Logic Array (PLA) may be customized by use of state information of a computer-readable program instruction, and the electronic circuit may execute the computer-readable program instruction, thereby implementing each aspect of the embodiments of the present disclosure.

Herein, each aspect of the embodiments of the present disclosure is described with reference to flowcharts and/or block diagrams of the method, device (system) and computer program product according to the embodiments of the present disclosure. It is to be understood that each block in the flowcharts and/or the block diagrams and a combination of each block in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer-readable program instructions may further be loaded to the computer, the other programmable data processing device or the other device, so that a series of operating operations are executed in the computer, the other programmable data processing device or the other device to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method, and computer program product according to multiple embodiments of the present disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed substantially concurrently and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction. It is well known to those having ordinary skill in the art that implementation through hardware, implementation through software, and implementation through a combination of software and hardware are all equivalent.

Each embodiment of the present disclosure has been described above. The above descriptions are exemplary, non-exhaustive and also not limited to each disclosed embodiment. Many modifications and variations are apparent to those having ordinary skill in the art without departing from the scope and spirit of each described embodiment of the present disclosure. The terms used herein are selected to explain the principle and practical application of each embodiment or improvements in the technologies in the market best or enable others having ordinary skill in the art to understand each embodiment disclosed herein. The scope of the present disclosure is limited by the appended claims.

What is claimed is:

1. A localization and tracking method, comprising:
   acquiring one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device, wherein the one or more images of even frames at least contain blobs corresponding to multiple luminous bodies arranged on a gamepad, and the gamepad is in communication connection with the head-mounted display device;
   determining Degree of Freedom (DoF) information of the head-mounted display device according to the one or more images of odd frames and attitude information of the head-mounted display device; and
   determining DoF information of the gamepad according to the one or more images of even frames, attitude information of the gamepad, and the DoF information of the head-mounted display device.

2. The method according to claim 1, wherein the preset second exposure duration is less than the first exposure duration.

3. The method according to claim 1, wherein the first exposure duration is adaptively adjusted according to an intensity of ambient light.

4. The method according to claim 1, wherein at least two tracking cameras are arranged on the head-mounted display device, exposure durations of respective tracking cameras having a same center point;
   acquiring one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device comprises:
collecting, by the at least two tracking cameras, multiple images of odd frames with the preset first exposure duration, each image of odd frame corresponding to each tracking camera; and collecting, by the at least two tracking cameras, multiple images of even frames with the preset second exposure duration, each image of even frame corresponding to each tracking camera.

5. The method according to claim 1, further comprising:
controlling the luminous bodies on the gamepad to be turned on according to a preset lighting duration when the one or more images of even frames are collected with the preset second exposure duration by the one or more tracking cameras arranged on the head-mounted display device, a middle time of the preset second exposure duration corresponding to a middle time of the preset lighting duration, wherein the preset lighting duration is equal to or greater than the preset second exposure duration.

6. The method according to claim 1, wherein determining DoF information of the head-mounted display device according to the one or more images of odd frames and attitude information of the head-mounted display device comprises:
calculating by a Simultaneous Localization and Mapping (SLAM) algorithm according to spatial structure information in the one or more images of odd frames, to obtain DoF of translational movement of the head-mounted display device;
obtaining DoF of rotational movement of the head-mounted display device according to the attitude information of the head-mounted display device that is collected by a first Inertial Measurement Unit (IMU) integrated in the head-mounted display device; and
determining the DoF information of the head-mounted display device based on the DoF of translational movement and the DoF of rotational movement.

7. The method according to claim 1, wherein after determining DoF information of the head-mounted display device according to the one or more images of odd frames and attitude information of the head-mounted display device, the method further comprises:
performing pre-integration on the DoF information of the head-mounted display device with reference to the attitude information of the head-mounted display device to obtain high-frequency DoF information of the head-mounted display device.

8. The method according to claim 1, wherein determining DoF information of the gamepad according to the one or more images of even frames, attitude information of the gamepad, and the DoF information of the head-mounted display device comprises:
performing blob detection on the one or more images of even frames to determine position information of all the blobs in the one or more images of even frames;
determining three-dimensional coordinates of the luminous bodies on the gamepad corresponding to the blobs in the one or more images of even frames according to the position information of all the blobs in the one or more images of even frames; and
determining the DoF information of the gamepad according to the three-dimensional coordinates of the luminous bodies on the gamepad corresponding to the blobs in the one or more images of even frames, the attitude information of the gamepad, and the DoF information of the head-mounted display device.

9. The method according to claim 8, wherein performing blob detection on the one or more images of even frames to determine position information of all the blobs in the one or more images of even frames comprises:
performing blob detection on each of the one or more images of even frames that are collected by the one or more tracking cameras to determine the position information of all the blobs in each of the one or more images of even frames, wherein the position information of all the blobs at least comprises position information of four blobs;
determining a correspondence between the blobs in the one or more images of even frames and the luminous bodies on the gamepad according to a distribution rule of each blob in the one or more images of even frames; and
determining the three-dimensional coordinates of the corresponding luminous bodies on the gamepad based on two-dimensional coordinates of the corresponding luminous bodies on the gamepad.

10. The method according to claim 8, wherein determining the DoF information of the gamepad according to the three-dimensional coordinates of the luminous bodies on the gamepad corresponding to the blobs in the one or more images of even frames, the attitude information of the gamepad, and the DoF information of the head-mounted display device comprises:
determining DoF of translational movement according to the three-dimensional coordinates of the luminous bodies on the gamepad corresponding to the blobs in the one or more images of even frames;
determining DoF of rotational movement of the gamepad according to the attitude information of the gamepad;
determining the DoF information of the gamepad according to the DoF of translational movement and the DoF of rotational movement; and
performing coordinate transformation on the DoF information of the gamepad according to the DoF information of the head-mounted display device.

11. The method according to claim 8, wherein after determining the DoF information of the gamepad according to the three-dimensional coordinates of the luminous bodies on the gamepad corresponding to the blobs in the one or more images of even frames, the attitude information of the gamepad, and the DoF information of the head-mounted display device, the method further comprises:
performing pre-integration on the DoF information of the gamepad with reference to the attitude information of the gamepad to obtain high-frequency DoF information of the gamepad.

12. The method according to claim 1, wherein the one or more images of odd frames at least contain hand or hands, and the method further comprises:
determining DoF information of the hand or hands according to the one or more images of odd frames.

13. The method according to claim 12, wherein determining DoF information of the hand or hands according to the one or more images of odd frames comprises:
inputting the one or more images of odd frames to a preset convolutional neural network model to obtain positions of multiple key points of the hand or hands; and
determining the DoF information of the hand or hands according to the positions of the multiple key points of the hand or hands.

14. The method according to claim 13, further comprising an operation of training the preset convolutional neural network model, which comprises:
- acquiring multiple scenario images, the scenario images containing hand or hands;
- marking positions of the multiple key points of the hand or hands in the multiple scenario images, and forming an image training sample set with the multiple marked scenario images; and
- training the convolutional neural network model according to the image training sample set.

15. A non-transitory computer-readable storage medium, in which a computer program is stored, the computer program being executed by a processor to implement the method according to claim 1.

16. A localization and tracking platform, comprising a memory storing instructions and a processor in communication with the memory, wherein the processor is configured to execute the instructions to:
- acquire one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device, wherein the one or more images of even frames at least contain blobs corresponding to multiple luminous bodies arranged on a gamepad, and the gamepad is in communication connection with the head-mounted display device;
- determine DoF information of the head-mounted display device according to the one or more images of odd frames and attitude information of the head-mounted display device; and
- determine DoF information of the gamepad according to the one or more images of even frames, attitude information of the gamepad, and the DoF information of the head-mounted display device.

17. A head-mounted display system, wherein the head-mounted display system comprises a head-mounted display device, a gamepad connected to the head-mounted display device, and a localization and tracking platform, at least two tracking cameras are arranged on the head-mounted display device, and the gamepad is provided with multiple luminous bodies, wherein the localization and tracking platform comprises a memory storing instructions and a processor in communication with the memory, wherein the processor is configured to execute the instructions to:
- acquire one or more images of odd frames that are collected with a preset first exposure duration by one or more tracking cameras arranged on a head-mounted display device as well as one or more images of even frames that are collected with a preset second exposure duration by the one or more tracking cameras arranged on the head-mounted display device, wherein the one or more images of even frames at least contain blobs corresponding to multiple luminous bodies arranged on a gamepad, and the gamepad is in communication connection with the head-mounted display device;
- determine DoF information of the head-mounted display device according to the one or more images of odd frames and attitude information of the head-mounted display device; and
- determine DoF information of the gamepad according to the one or more images of even frames, attitude information of the gamepad, and the DoF information of the head-mounted display device.

18. The system according to claim 17, wherein exposure durations of respective tracking cameras arranged on the head-mounted display device have a same center point.

19. The system according to claim 17, wherein four tracking cameras are arranged on the head-mounted display device, wherein the four tracking cameras are arranged in the head-mounted display device according to a preset first position constraint rule, and the preset first position constraint rule is used for ensuring that each tracking camera meets requirements of the head-mounted display device on Field Angle Of View (FOV).

20. The system according to claim 17, wherein multiple luminous bodies are arranged on the gamepad according to a preset second position constraint rule, wherein being arranged according to the preset second position constraint rule meets the following conditions: coincidence or adhesion of local pattern information in images collected within a preset distance range from the tracking cameras to the gamepad does not occur, and blobs corresponding to at least four luminous bodies are presented in every image collected by the one or more tracking cameras at any angles.

* * * * *